US012076887B2

(12) United States Patent
Kirbach

(10) Patent No.: US 12,076,887 B2
(45) Date of Patent: Sep. 3, 2024

(54) SWITCHABLE MAGNET DEVICE

(71) Applicant: B.T. INNOVATION GMBH, Magdeburg (DE)

(72) Inventor: Marko Kirbach, Magdeburg (DE)

(73) Assignee: B.T. INNOVATION GMBH, Magdeburg (DE)

( * ) Notice: Subject to any disclaimer, the term of this patent is extended or adjusted under 35 U.S.C. 154(b) by 205 days.

(21) Appl. No.: 17/914,045

(22) PCT Filed: Mar. 25, 2021

(86) PCT No.: PCT/EP2021/057761
§ 371 (c)(1),
(2) Date: Sep. 23, 2022

(87) PCT Pub. No.: WO2021/191358
PCT Pub. Date: Sep. 30, 2021

(65) Prior Publication Data

US 2023/0117992 A1 Apr. 20, 2023

(30) Foreign Application Priority Data

Mar. 25, 2020 (WO) ................ PCT/EP2020/058400
Sep. 1, 2020 (DE) ..................... 10 2020 122 839.2

(51) Int. Cl.
*H01F 7/04* (2006.01)
*B28B 7/00* (2006.01)

(52) U.S. Cl.
CPC ............ *B28B 7/002* (2013.01); *B28B 7/0017* (2013.01); *B28B 7/0041* (2013.01); *H01F 7/04* (2013.01)

(58) Field of Classification Search
CPC ................................ B28B 7/0041; H01F 7/04
See application file for complete search history.

(56) References Cited

U.S. PATENT DOCUMENTS 4,738,605 A 4/1988 Aerts et al.
6,082,701 A 7/2000 Reymann
(Continued)

FOREIGN PATENT DOCUMENTS

DE 1946274 9/1966
DE 2309819 8/1974
(Continued)

OTHER PUBLICATIONS

International Search Report, with English translation, issued in corresponding International Application No. PCT/EP2021/057761, date of mailing Jun. 28, 2021 (8 pages).
(Continued)

*Primary Examiner* — James Sanders
(74) *Attorney, Agent, or Firm* — FLYNN THIEL, P.C.

(57) ABSTRACT

A switchable magnet device comprising at least one magnet package which can be moved between an interaction position and a release position, wherein the magnet device is configured such that the at least one magnet package, when moving between the interaction position and the release position, at least in portions, performs a pivot movement about a pivot axis. An actuation device is also provided, which can be coupled to the at least one magnet package to move the at least one magnet package between the interaction position and the release position. In order to easily lift the magnet from the formwork support in a small working space, the magnet device is configured such that the at least one actuation device, at least in portions and at least temporarily during the pivot movement of the at least one magnet package, performs a linear movement in a linear movement direction.

10 Claims, 4 Drawing Sheets

(56) References Cited

U.S. PATENT DOCUMENTS

| | | | |
|---|---|---|---|
| 6,168,221 | B1 | 1/2001 | Carruth et al. |
| 7,021,601 | B2 | 4/2006 | Vappula |
| 7,419,131 | B2 | 9/2008 | Von Limburg |
| 2005/0025853 | A1 | 2/2005 | Ness |
| 2017/0218622 | A1 | 8/2017 | Manthei et al. |

FOREIGN PATENT DOCUMENTS

| | | | |
|---|---|---|---|
| DE | 2907508 | A1 | 9/1980 |
| DE | 19903819 | A1 | 8/2000 |
| DE | 20111243 | U1 | 10/2001 |
| DE | 20309970 | U1 | 12/2004 |
| DE | 60319620 | T2 | 4/2009 |
| DE | 202013102330 | U1 | 10/2014 |
| EP | 1789233 | B1 | 5/2007 |
| GB | 1266959 | | 3/1972 |
| SU | 1527123 | A2 | 12/1989 |

OTHER PUBLICATIONS

Written Opinion of the International Searching Authority issued in corresponding International Application No. PCT/EP2021/057761, date of mailing Jun. 28, 2021 (10 pages).

Invitation to Pay Additional Fees with Partial International Search issued in International Application No. PCT/EP2020/058400, date of mailing Nov. 25, 2020 (16 pages).

Office Action issued in corresponding Germany Application No. 10 2020 122 839.2, dated Jan. 24, 2024 (6 pages).

SWITCHABLE MAGNET DEVICE

The present invention relates to a switchable magnet device and a system comprising a formwork device and a switchable magnet device.

From the utility model specification DE 20309970 U1 there is known a switchable magnet device according to the preamble of claim 1. From that there is known a switchable magnet device for fixing a formwork device on a formwork support. A magnet is pivotally mounted about a pivot axis. The magnet can be transferred from a locking position, in which the magnet is magnetically operatively connected to a formwork support, to a release position by an actuation lever that is coupled to the magnet. In the locking position, the formwork device for the production of concrete parts is fixed in its position.

The lever arm from the pivot axis to the point of application of the lever reduces the lifting force to release the magnet from the formwork device compared to the case where the magnet is lifted translationally.

Nevertheless, for the actuation of the magnet, the actuation lever itself must be pivoted, which requires a considerable working space. Furthermore, the actuation lever is supported by a formwork device during the pivot movement, which leads to considerable stress on the formwork device. Therefore, these formwork devices must be sized accordingly. Frictional forces or even jamming can also occur at the coupling point between the actuation lever and the magnet, which increases the actual lifting forces.

The present invention has been made in view of the problems previously mentioned, and it is based on the problem of providing a switchable magnet device which requires a small working space and allows the magnet to be easily lifted from the formwork support.

This problem is solved by a switchable magnet device according to claim 1. Preferred embodiments are set forth in the sub-claims.

According to a first aspect, a switchable magnet device is provided that comprises at least one magnet package that can be transferred between an interaction position, in which the magnet package is in magnetic operative connection preferably to a magnetizable formwork support, preferably by abutting to the formwork support, and a release position, in which the magnetic operative connection between the formwork support and the magnet package is reduced, preferably eliminated. The magnet device is configured such that the at least one magnet package, when moving between the interaction position and the release position, at least in portions, performs a pivot movement about a pivot axis. Furthermore, the magnet device comprises at least one actuation device that can be coupled to the at least one magnet package to move the at least one magnet package between the interaction position and the release position. The magnet device is configured such that the at least one actuation device, at least in portions and at least temporarily during the pivot movement of the at least one magnet package, performs a linear movement along a linear movement direction.

According to the above aspect, the at least one magnet package when moving between the interaction position and the release position performs, at least in portions, a pivot movement about a pivot axis. In this case, the operation of the lever arm, as mentioned above, can reduce the lifting force transferred to the magnet package by the actuation device. However, the magnet device is configured such that the at least one actuation device, at least in portions and at least temporarily during the pivot movement of the at least one magnet package performs a linear movement in a linear movement direction. Therefore, work can be carried out in a small working space and the operation is facilitated for an operator. Also, the transfer does not require the actuation device to be supported on a pivot axis of a formwork device. This facilitates the configuration.

According to another aspect, the magnet device may include a plurality of the magnet packages, and the magnet device may be configured such that the plurality of magnet packages at least temporarily simultaneously performs the pivot movement about their respective pivot axis.

If a plurality of magnet packages is provided, there can be achieved high magnetic forces with which a formwork device is pressed against the formwork support. Each of the plurality of magnet packages performs a pivot movement about its respective pivot axis, which enables easy lifting. Each of the plurality of magnet packages performs a pivot movement about its respective pivot axis, which facilitates an easy lifting. Since the pivot movement may occur at least temporarily simultaneously, uniform lifting of the magnet packages may occur.

Preferably, the linear movement direction is a direction substantially perpendicular to the formwork support.

This allows the magnet packages to be lifted particularly quickly and effectively. Also, a working space can be kept small in a direction parallel to the formwork support.

According to a further aspect, the at least one actuation device may be respectively coupled to the at least one magnet package such that the at least one magnet package has at least one degree-of-freedom intersecting the linear movement direction, respectively, with respect to the portion linearly movable along the linear movement direction of the actuation device.

In this way, a decoupling of the pivot movement of the at least one magnet package and the linear movement of at least one portion of the actuation device can be achieved in a particularly simple manner. Preferably, at least one degree-of-freedom is a rotational degree-of-freedom about an axis parallel to the pivot axis. This can effectively prevent jamming of the magnet package and actuation device.

Preferably, the magnet device comprises at least one guide device configured to guide the at least one actuating means along the linear movement direction.

This allows the linear movement of the actuation device to be reliably achieved. Potential constraining forces can also be absorbed by the guide device, which can also prevent jamming of the magnet package and actuation device.

According to a further aspect, the at least one actuation device can be respectively coupled to the at least one magnet package at a load application point that is further away from the respective pivot axis than the application point of the resulting force that acts on the at least one magnet package due to the magnetic operative connection, respectively, for performing the pivot movement.

In this way, it can be reliably ensured that a lower lifting force than the resulting magnetic force is required to lift the magnet packages.

According to a further aspect, the magnet device may comprise at least one support device on which the at least one magnet package is pivotally mounted about the respective pivot axis.

A pivot axis can be specified by the support device. Thus, the magnet package can have a well-defined pivot axis on the magnet device and does not have to, for example, be supported on the formwork support.

Preferably, the at least one actuation device is relatively movable with respect to the at least one support device, particularly preferably, along the linear movement direction.

As a result, the pivot movement can be reliably introduced into the magnet package, since the relative movement between the support device and the actuation device can prevent a translational movement of the at least one magnet package.

According to yet another aspect, the magnet device may be configured such that the at least one magnet package performs a translational movement during or after the pivot movement about the respective pivot axis.

The pivot movement can rapidly reduce the magnetic force resulting from the magnetic interaction between the at least one magnet package and the formwork support. With a lower effective magnetic force, the at least one magnet package can be quickly lifted translationally from the formwork support with a low lifting force.

Preferably, the magnet device further comprises a locking mechanism configured to lock the pivot movement of the at least one magnet package. Particularly preferably, the locking mechanism is configured to lock relative movement between the at least one actuation device and the at least one support means.

This allows the pivot movement to be locked after a predetermined path along the pivot movement, eliminating the need for a necessary workspace for continued pivot movement. As stated above, the magnetic force is reduced after a predetermined path along the pivot motion, allowing for easy translational lifting. If the pivot movement is locked, a lifting force with a component along the linear movement direction can reliably initiate a translational motion of the at least one magnet package. If the at least one actuation device is relatively movable with respect to the at least one support device, the pivot movement can be reliably blocked by blocking this degree-of-freedom.

According to a further aspect, the at least one actuation device may have coupling locations with the at least one magnet package at least during translational movement of the at least one magnet package arranged such that no torque is applied to the actuation device. Preferably, the coupling locations are arranged symmetrically with respect to an axis of the linear movement direction passing through an actuating location at which a load is introduced into the actuation device along the linear movement direction.

If no torque acts on the actuation device, the actuation device can be moved particularly easily along the linear movement direction. In particular, no constraining forces are created. This can be achieved, in particular, by arranging the coupling locations symmetrically with respect to an axis passing through an actuating location at which an operator grips the actuation device along the linear movement direction.

Preferably, the at least one actuation device has a linear extension portion extending along the linear movement direction.

This facilitates alignment along the linear movement direction and thus ease of operation for an operator. In addition, a lifting force can be transmitted along the linear movement direction along the linear extension portion.

According to still another aspect, the actuation device may include at least one lever portion configured to shift a force having a component along the linear movement direction from an axis of the linear movement direction passing through an actuation location where a load is introduced into the actuation device along the linear movement direction, respectively, to at least one coupling location remote from the axis of the linear movement direction. Preferably, the lever portion is coupled to the previously mentioned linear extension portion.

The lever portion may provide the actuating point spaced from the coupling points at which the actuation device is coupled to the at least one magnet pack. Thus, an adaptation to spatial boundary conditions in a formwork device can be made. In addition, a lifting force can be introduced centrally into the lever portion and then shifted outward for introduction into the magnet packages to provide the greatest possible lever arm.

According to another aspect, a single actuation device may be coupled to the plurality of magnet packages. This simplifies configuration by allowing an operator to transfer the plurality of magnet packages from the locking position to the release position using a single actuation device.

Preferably, the one actuation device has coupling locations with the magnet packages arranged so that no torque acts on the actuation device for performing the pivot movement of the plurality of magnet packages. The coupling locations are preferably arranged symmetrically with respect to an axis of the linear movement direction passing through an actuating location at which a load is introduced into the actuation device along the linear movement direction.

Particularly in the case of a plurality of magnet packages, the coupling locations can also be arranged to perform the pivot movement in such a way that no torque is applied to the actuation device. This makes it particularly easy to move the actuation device along the linear movement direction even during the pivoting movement of the magnet packages. In particular, no constraining forces are created. This can be achieved, in particular, by arranging the coupling locations symmetrically with respect to an axis passing through an actuating location at which an operator grips the actuation device along the linear movement direction.

Preferably, at least a part of the plurality of magnet packages is formed uniformly.

This allows equal magnetic forces to act between the individual magnet packages and the formwork support. This enables a uniform load to be applied to the actuation device, resulting in particular in the absence of torque for the actuation device.

Preferably, the plurality of magnet packages is arranged uniformly in a circumferential direction about a central axis.

This simplifies the configuration and can also provide a uniform load on the actuation device.

Preferably, the center axis coincides with an axis of the linear movement direction passing through an actuating location where a load is introduced into the actuation device along the linear movement direction.

This also simplifies the configuration. In particular, the lifting force can be introduced centrally and then distributed evenly to the magnet packages around the central axis. According to still another aspect, a single support device may be disposed at a center between the plurality of magnet packages. Preferably, the previously mentioned central axis runs through the support device. Particularly preferably, all magnet packages of the plurality of magnet packages are pivotally mounted on the one support device. In particular, it is even more preferred if opposing magnet packages have a common pivot axis.

As a result, the magnet device is kept compact and the working space can be kept small, in particular the support device can be arranged centrally and a symmetrical introduction of force into the support device can be achieved.

According to a further aspect, the magnet device may comprise at least one release support device configured to support transfer of the respective magnet package into the release position. Preferably, the release support device is coupled to the at least one support device and preferably comprises at least one elastic element, more preferably a spring element.

Thus, the lifting force to be applied by an operator can be further reduced. For example, an elastic element such as a compression spring can be provided on the side of the formwork support, which is arranged between the support device and the formwork support. The spring force can support a movement away from the formwork support.

Another aspect is directed to a system comprising a formwork device comprising a formwork portion for forming concrete parts, and a switchable magnet device according to any of the preceding aspects. The switchable magnet device may be coupled to the formwork device at least in the interaction position of the at least one magnet package such that a pressing force is transmitted to the formwork device with a component in the direction of the formwork support.

Thus, above magnet device can fix the formwork device in its position in the interaction position. In particular, an access to the actuation device on the formwork device can be provided relatively small compared to the prior art, in which a large recess is provided for the actuating lever.

Preferably, the magnet device is arranged at least in portions in an interior of the formwork device. This allows the magnet device to be protected from the formwork device, and the system can be made compact. Since the actuation device can move linearly, only a narrow recess needs to be provided to guide the actuation device out.

According to a further aspect, the at least one guide device may comprise a portion of the formwork device, the formwork device preferably comprising a guide bushing configured to guide a portion of the actuation device.

Thus, the actuation device can be guided by the formwork device, which stands stably on the formwork support. This can ensure stable guidance. A guide bushing is particularly easy to attach to the formwork device.

According to a further aspect, the system may comprise at least one elastic element, preferably comprising a spring element, via which the magnet device is coupled to the formwork device at least in the interaction position of the at least one magnet package.

This can ensure that the pressing force is reliably introduced into the formwork device. In particular, a double fit can be avoided. Furthermore, the elastic element can also function as part of the release support means.

The aspects set forth previously are explained in detail below with reference to the accompanying drawings.

FIG. 2 shows a longitudinal sectional view of the system of FIG. 1, where a longitudinal plane of symmetry of the magnet device has been cut through.

Figure 5:
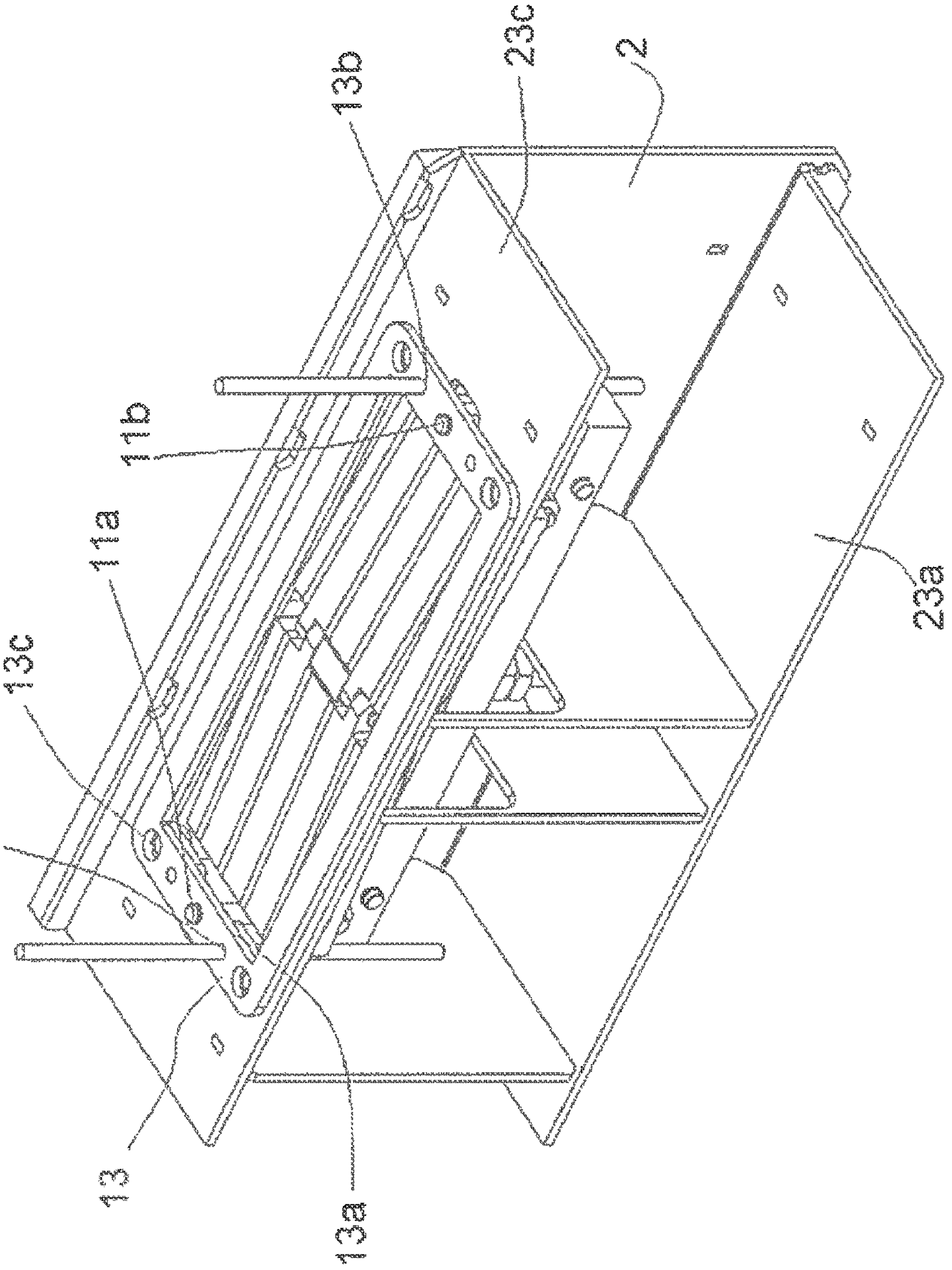

FIG. 5 a formwork device with a magnet device during assembly in perspective view.

In the following description, directional indications such as "above" and "below" are not to be understood as restrictive. Rather, they are intended only to facilitate understanding of the instructions.

Figure 1:
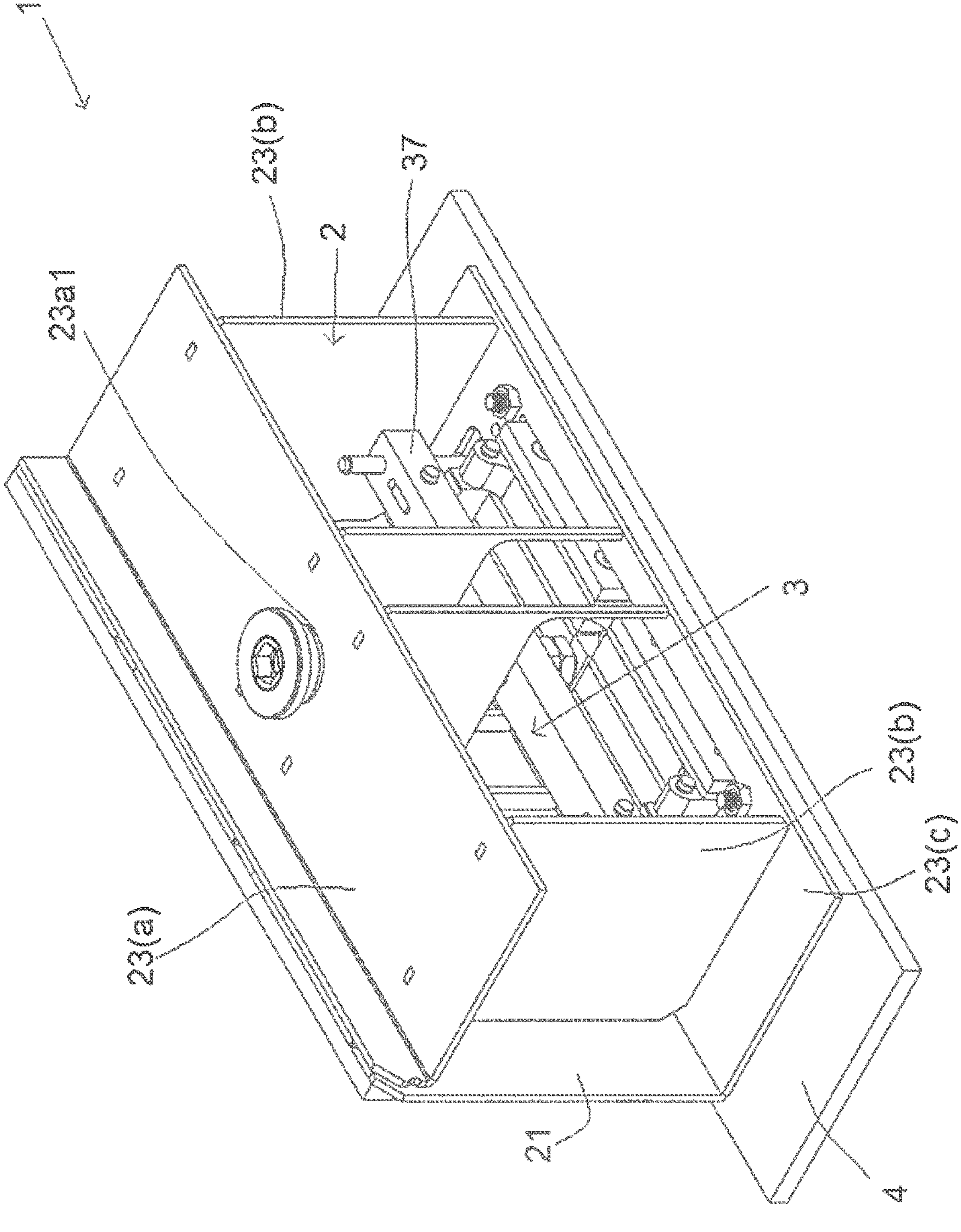
FIG. 1 shows a perspective view of a system comprising a formwork device and a magnet device, wherein the formwork device is arranged on a formwork support.
Figure 2:
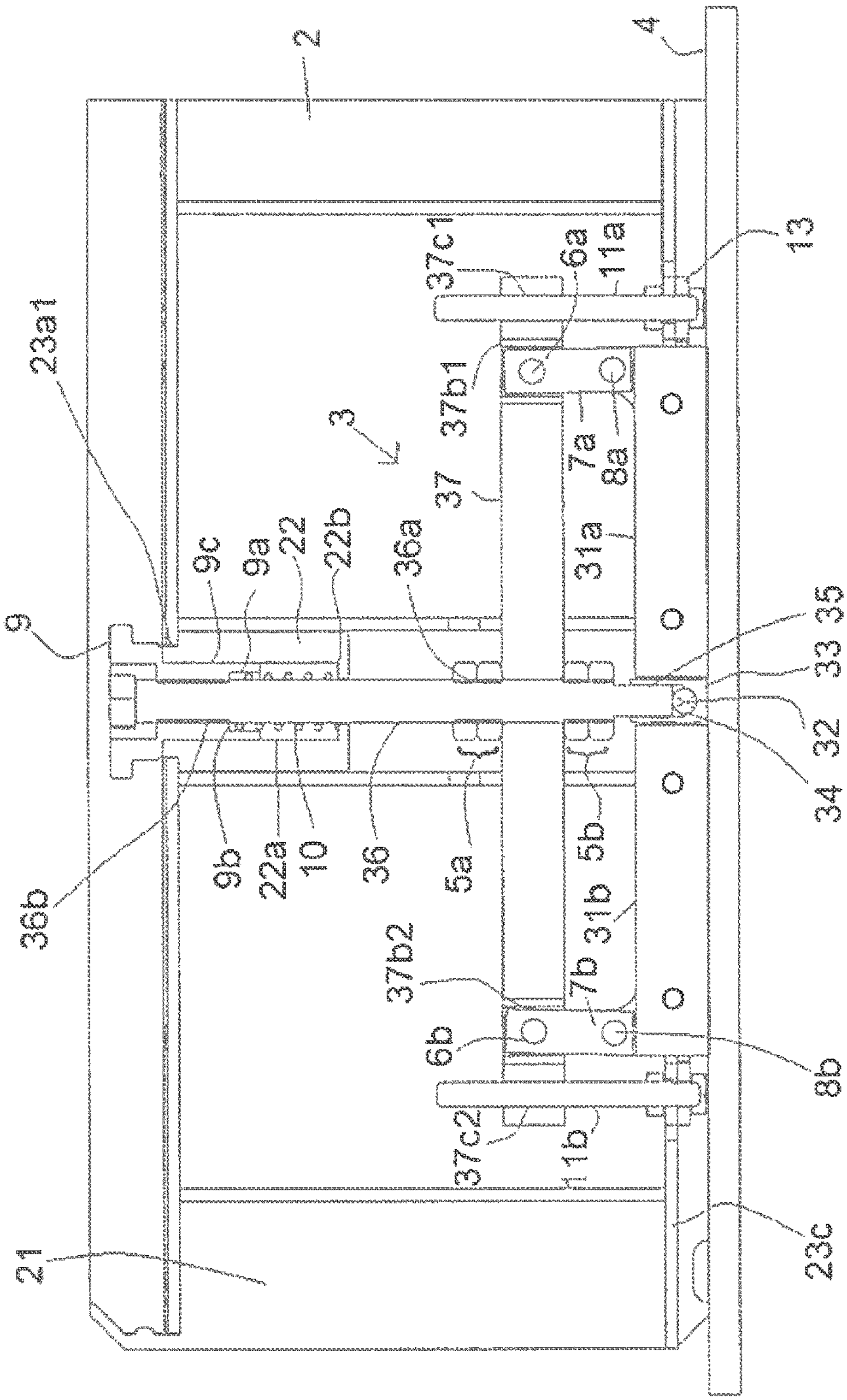

FIGS. 1 and 2 show a system 1 that includes a formwork device 2. The formwork device 2 has a formwork portion 21 for shaping concrete parts and is coupled to a magnet device 3.

In the present embodiment, the magnet device 3 comprises two magnet packages 31*a* and 31*b*, each of which is transferable between an interaction position and a release position. FIGS. 1 and 2 show the magnet packages 31*a* and 31*b*, respectively, in the interacting position, in which the magnet packages 31*a* and 31*b* are in magnetic operative connection with a magnetizable formwork support 4. As shown in particular in FIG. 2, the magnet packages 31*a* and 31*b* rest with their underside against the formwork support 4. The formwork device 4 is made of a ferromagnetic material and can thus be magnetized. In the interaction position of the two magnet packages 31*a* and 31*b*, there is a magnetic interaction between the formwork support 4 and the two magnet packages 31*a* and 31*b*, which applies a force component to the magnet packages 31*a* and 31*b* in the direction of the formwork support 4.

The two uniform magnet packages 31*a* and 31*b* each have at least one permanent magnet. Preferably, the magnet packages 31*a* and 31*b* each have a plurality of permanent magnet elements in bar form spaced parallel to each other, and further have ferromagnetic elements disposed therebetween.

In the interaction position of the magnet packages 31*a* and 31*b*, the magnetic force acting on the magnet packages 31*a* and 31*b* is transmitted to the formwork device 2 so that the formwork device 2 is fixed in position. In particular, in this position the formwork portion 21 forms a lateral boundary for a concrete part to be cast. By fixing via the magnet device 3, the formwork device can withstand high concreting pressures and enable true-to-size production of concrete parts.

With the aid of FIGS. 1 to 4, the structure of the magnet device 3 will now be described.

The magnet device 3 has a single pivot axis 32 about which the two magnet packages 31*a* and 31*b* are each pivotally mounted. The magnet packages 31*a* and 31*b* are attached to a support device 33. The support device has a block-shaped part through which a cylindrical shaft 34 penetrating parallel opposite side surfaces extends parallel to the formwork support 4, so that cylindrical projections project from the two side surfaces. A central axis of the shaft 34 forms the pivot axis 32.

The support device 33 further comprises an axisymmetric opening 35 extending downwardly from an upper surface of the block-shaped portion in a direction perpendicular to the formwork support 4.

A cylindrical pin 36 is arranged in the opening 35 so as to be relatively movable with respect to the support device 33. The bolt 36 extends linearly in a direction perpendicular to the formwork support 4. The bolt 36 includes a first threaded portion 36*a* and a second threaded portion 36*b*. At the level of the first threaded portion 36*a*, a lever plate 37 is arranged to extend substantially perpendicular to both sides of the bolt 36 parallel to the formwork support 4. The lever plate 37 arranges the pin centrally inside a through hole 37*a*. As shown in FIG. 1, the lever plate 37 has a substantially cuboid bar shape. Lever plate 37 is secured to bolts 36 above and below, respectively, by lock nut structures 5*a* and 5*b*. This allows for easy manufacturing with safe power transmission at the same time. Preferably, the lever plate 37 has an internal thread in the area of the through opening 37. This makes power transmission more efficient.

In the respective outer edge portions, the lever plate 37 has respective elongated holes **37*b*1 and 37*b*2 penetrating the lever plate 37 on both sides of the bolt 36. The elongated holes 37*b*1 and 37*b*2 are penetrated by pins 6*a* and 6*b*, respectively, in a direction perpendicular to the extending direction of the lever plate 37. Plate-shaped compensating elements 7*a* and 7*b* are rotatably mounted on each of the bolts 6*a* and 6*b***.

The plate-shaped balancing elements **7*a* and 7*b* are penetrated at one end on the side of the lever plate 37 by the bolts 6*a* and 6*b*, respectively. At the opposite end, plate-shaped compensating elements 7*a* and 7*b* each have openings through which bolts 8*a* and 8*b* are guided. The magnet packages 31*a* and 31*b* are each rotatably mounted on these pins 8*a* and 8*b***.

Still further out with respect to the elongated holes **37*b*1 and 37*b*2, the lever plate 37 has respective cylindrical openings 37*c*1 and 37*c*2 on either side of the bolt 36 which penetrate the lever plate 37 in the linear movement direction. The openings 37*c*1 and 37*c*2 are penetrated by guide rods 11*a* and 11*b*, respectively, provided on the formwork device 2**.

A knob 9 is screwed to the second threaded portion **36*b* at an upper end of the bolt 36 as an actuating member via an internal thread. The knob 9 extends in the linear movement direction. On its underside, the knob 9 has a recessed receiving space 9*a* that extends upward and is bounded by a bottom surface 9*b***.

As can be seen in the sectional view of FIG. 2, the formwork device 2 has a bushing 22. The bushing 22 can be provided on the formwork device 2, for example, by welding. The bushing 22 has a cylindrical recess **22*a* bounded on a lower surface by a bottom surface 22*b***.

The knob 9 rests with its bottom surface **9*b* on one end of a spring 10, which is partially received in the receiving space 9*a*. The opposite end of the spring 10 rests on the bottom surface 22*b* of the bushing 22**.

The mode of operation of the present invention will be described below.

An operator can cause the magnet packages **31*a* and 31*b* to perform a pivot movement about the common pivot axis 32 by pulling the knob 9** from the interaction position.

The operator can initiate the pivot movement of the magnet packages **31*a* and 31*b* solely by applying a lifting force in a direction perpendicular to the formwork support 4, i.e. along the linear movement direction. In this case, the force is transmitted from the knob 9 to the central bolt 36 via the second threaded portion 36*b*. Finally, via the first threaded portion 36*a* and the lock nut structures 5*a* and 5*b*, the force is transferred from the central bolt 36 outwardly via the lever plate 37, where it is applied to the magnet packages 31*a* and 31*b* via the bolts 6*a* and 6*b*, the compensating elements 7*a* and 7*b*, and the bolts 8*a* and 8*b***, respectively.

Thus, the bolts **8*a* and 8*b* are each load application locations for the magnet packages 31*a* and 31*b*, while the bolts 6*a* and 6*b* are each coupling locations of the lever plate 37 as part of the actuation device with the magnet packages 31*a* and 31*b***.

Figure 3:
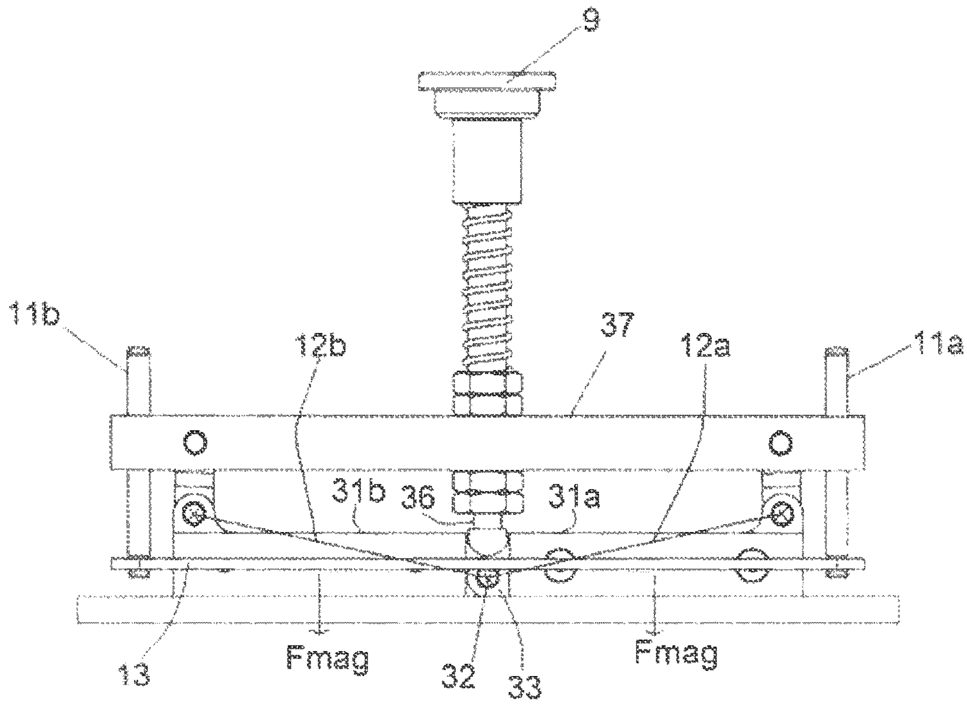
FIG. 3 shows a side view of the magnet device, with the magnet packages shown in a lowered position (locking position).

The lifting force is introduced into each of the magnet packages **31*a* and 31*b* as a force pointing substantially in a direction perpendicular to the formwork support 4. As shown in FIG. 3, the lifting forces distributed between the two pins 8*a* and 8*b* each act with a lever arm 12*a* and 12*b*, respectively, with respect to the pivot axis 32. Thus, a torque acts on the magnet packages 31*a* and 31*b*, which cannot be absorbed by the shaft 34 of the support device 33. Therefore, the magnet assemblies 31*a* and 31*b* each perform a pivot movement while the actuation device formed by the knob 9, the pin 36 and the lever plate 37 is moved linearly perpendicularly away from the formwork support 4**.

Figure 4:
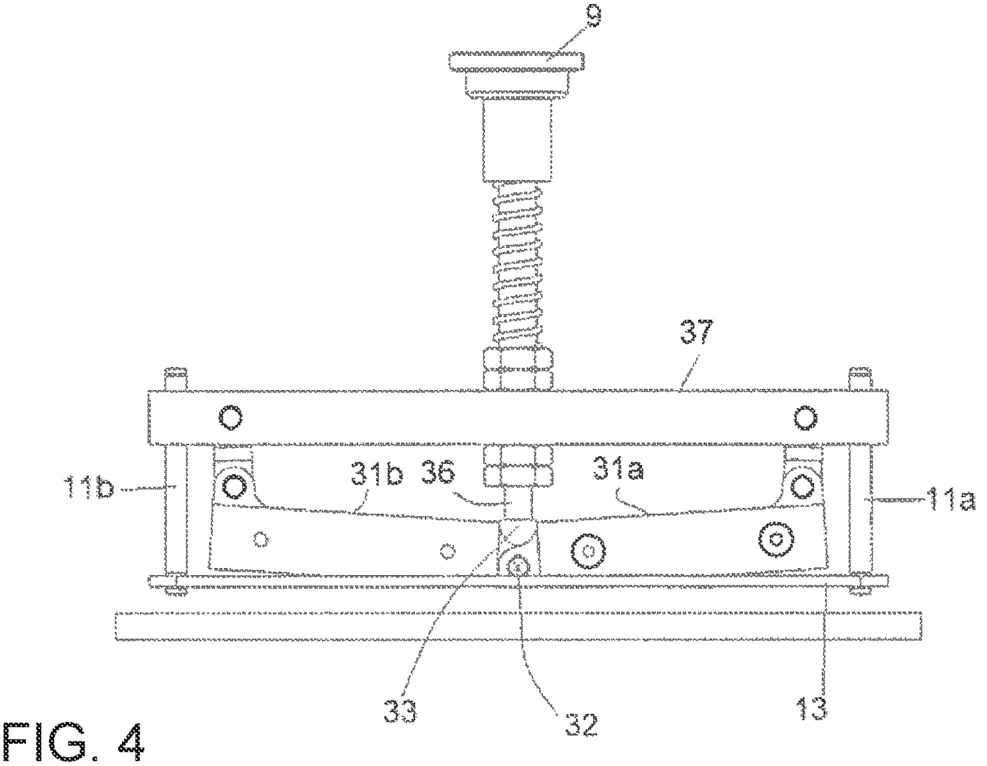
FIG. 4 shows a side view of the magnet device, with the magnet packages shown in a raised position (release position).

In the above embodiment, a switchable magnet device 3 is thus provided, which comprises at least one magnet package **31*a* or 31*b*, which can be transferred between an interaction position, in which the magnet package 31*a* or 31*b* is in an operative magnetic connection with a formwork support 4, and a release position, in which the operative magnetic connection between the formwork support and the magnet package is reduced. The release position is shown in FIG. 4. In it, the magnet packages are shown in a pivoted position. The magnet device 3 is thus configured in such a way that the at least one magnet package 31*a* or 31*b* performs a pivot movement about the pivot axis 32** at least in portions during the transfer between the interaction position and the release position.

Furthermore, the magnet device comprises at least one actuation device 9, 36 and 37, which can be coupled to the at least one magnet package **31*a* or 31*b* for transferring the at least one magnet package 31*a* or 31*b* between the interaction position and the release position. As shown above, the magnet device is configured such that the at least one actuation device 9, 36 and 37, at least in portions and at least temporarily during the pivot movement of the at least one magnet package 31*a* or 31*b*** performs a linear movement in a linear movement direction.

According to the above aspect, the at least one magnet package **31*a* or 31*b* when moving between the interaction position and the release position performs, at least in portions, a pivot movement about a pivot axis 32. In this case, lever arm action can be used to reduce the lifting force transmitted to the magnet package via the actuation device 9, 36 and 37. The magnet device 3 is configured such that the at least one actuation device 9, 36 and 37, at least in portions and at least temporarily during the pivot movement of the at least one magnet package 31*a* or 31*b* performs a linear movement in a linear movement direction. Therefore, work can be carried out in a small working space and the operation is facilitated for one operator. In particular, the operator can pull the knob 9 along the linear movement direction. Also, the transfer does not require the actuation device 9, 36 and 37** to be supported on a pivot axis of a formwork device. This facilitates the configuration.

As explained above, the magnet device 3 has a plurality of the magnet packages **31*a* and 31*b*. The magnet device is configured such that the plurality of magnet packages 31*a* and 31*b* simultaneously perform the pivot movement about their respective pivot axis 32**, at least temporarily.

Thus, high magnetic forces can be achieved with which the formwork device 2 is pressed against the formwork support 4. Each of the plurality of magnet packages **31*a* and 31*b* performs a pivot movement about its respective pivot axis 32, which enables easy lifting. Since the pivot movement can take place simultaneously, at least temporarily, a uniform lifting of the magnet packages can take place, as shown in FIG. 4**.

In the embodiment, the linear movement direction is a direction substantially perpendicular to the formwork support.

This allows the magnet packages **31*a* and 31*b* to be lifted particularly quickly and effectively. Also, a working space can be kept small in a direction parallel to the formwork support 4**.

As explained above, the actuation device is coupled to the magnet packages **31*a* and 31*b* via the compensating elements 7*a* and 7*b***, respectively. The compensating elements 7*a* and 7*b* can each be rotated around the bolts 6*a* and 6*b*. Furthermore, the magnet packages 31*a* and 31*b* are each rotatable with respect to the compensating elements 7*a* and 7*b* by the bolts 8*a* and 8*b*. Thus, the magnet packages 31*a* and 31*b* each have two rotational degrees of freedom, connected in series, about respective axes parallel to the pivot axis 32 but spaced apart from each other, with respect to the actuation device. Thus, with respect to the portion of the actuation device that moves linearly along the linear movement direction (in this case, the rigid body formed by pin 36, lever plate 37, and knob 9), the magnet packages each have at least one degree of freedom intersecting the linear movement direction.

In this way, a decoupling of the pivot movement of the at least one magnet package and the linear movement of at least one portion of the actuation device can be achieved in a particularly simple manner. In particular, the two rotational degrees of freedom connected in series can be used on the one hand to compensate for the distance between the magnet packages 31*a* and 31*b* and the actuation device and on the other hand to compensate for the position of the magnet packages. These compensations are advantageous due to different trajectories of the pivoting movement of the magnet packages and the linear movement of the actuation device.

Further, guide rods 11*a* and 11*b* are provided to penetrate openings 37*c*1 and 37*c*2, respectively. Thus, a pair of guide rods 11*a* and 11*b* and perimeters of openings 37*c*1 and 37*c*2 each constitute a guide device. As can be seen from a comparison of FIGS. 3 and 4, the actuation device moves linearly upward and is guided by guide rods 11*a* and 11*b*. Thus, the lever plate 37 is arranged higher in FIG. 4 than in FIG. 3.

Also, the central pin 36 is provided to slide in the opening 35 of the support means. Thus, the perimeter of the opening 35 and the bolt 36 also form a guide device. The bolt 36 protrudes further from the support device 33 in FIG. 4 than in FIG. 3.

Further, an outer circumferential surface 9*c* of the knob 9 is slidably received in the recess 22*a* of the bushing 22. Therefore, the outline of the recess 22*a* together with the knob also represents a guide device.

Thus, each of the portions 9, 36, 37 is guided along the linear movement direction.

This allows the linear movement of the actuation device to be reliably achieved. Potential constraining forces can also be absorbed by the guide device, which can prevent jamming of the magnet package and actuation device.

As explained above, pins 8*a* and 8*b* are load application locations for magnet packages 31*a* and 31*b*, respectively. The pins are each attached to an end of the magnet packages 31*a* and 31*b* remote from the pivot axis 32 in a direction perpendicular to the pivot axis 32. As shown in FIG. 3, the resultant magnetic forces Fmag acting on the magnet packages 31*a* and 31*b* can each be regarded as acting at the center of the magnet packages 31*a* and 31*b*.

Thus, the actuation device for performing the pivot movement is coupled with the magnet packages 31*a* and 31*b* in each case at a load application location which is further away from the respective pivot axis 32 than the application location of the resulting force Fmag which acts on the at least one magnet package in each case due to the magnetic operative connection. In this way, it can be reliably ensured that a lower lifting force than the resulting magnetic force is required to lift the magnet packages 31*a* and 31*b*.

Furthermore, the magnet device 3 has a support device 33 on which the magnet packages 31*a* and 31*b* are mounted so as to be pivotable about the respective pivot axis 32.

The pivot axis 32 can be specified by the support device 33. Thus, the magnet packages can have a well-defined pivot axis 32 on the magnet device 3 and does not have to, for example, be supported on the formwork support. Further, the support device may also perform other tasks such as guiding the central bolt 36 as described above.

The central bolt 36, as part of the actuation device, is slidably provided in the opening 35 of the support means 33. Thus, the one actuation device is relatively movable with respect to the at least one support means along the linear movement direction.

As a result, the pivoting movement can be reliably introduced into the magnet packages 31*a* and 31*b*, since freedom of movement for the pivoted magnet packages is ensured by the relative movement between the support means and the actuation device.

As shown in FIG. 4, in the release position the magnet packages 31*a* and 31*b* are not only pivoted but also lifted off the formwork support 4 together with the support device 33 in a direction perpendicular to the formwork support 4. Depending on the lifting force and the acting magnetic forces, the support means 33, which supports the magnet packages on the shaft 34, can be lifted off the ground. Thus, the magnet device 3 is configured such that the magnet packages perform a translational movement during or after the pivoting movement about the respective pivot axis 32.

The pivot movement can rapidly reduce the magnetic force resulting from the magnetic interaction between the at least one magnet package and the formwork support. With a lower effective magnetic force, the at least one magnet package can be quickly lifted translationally from the formwork support with a low lifting force.

The movement of the compensating elements 7*a* and 7*b* is limited by the outline of the respective elongated holes 37*b*1 and 37*b*2. Thus, once a certain amount of twisting of the compensating elements 7*a* and 7*b* about the pins 6*a* and 6*b* has been reached, no further twisting can take place. Thus, the outlines of the respective elongated holes 37*b*1 and 37*b*2 not only block the movement of the compensating elements 7*a* and 7*b*, but also the pivot movement of the magnet packages. In this regard, the blocking mechanism is also configured to block relative movement between the at least one actuation device and the at least one support device 33 by the outlines of the respective elongated holes 37*b*1 and 37*b*2.

This allows the pivot movement to be locked after a predetermined path along the pivot movement, eliminating the need for a necessary workspace for continued pivot movement. As stated above, the magnetic force is reduced after a predetermined path along the pivot motion, allowing for easy translational lifting. If the pivot movement is locked, a lifting force with a component along the linear movement direction can reliably initiate a translational motion of the at least one magnet package. If the at least one actuation device is relatively movable with respect to the at least one support means, the pivot movement can be reliably blocked by blocking this degrees-of-freedom.

As explained above, the bolts 6*a* and 6*b* act as coupling locations of the actuation device with the magnet packages, The bolts 6*a* and 6*b* are arranged symmetrically with respect to a central axis of the central bolt 36 on both sides. The center axis of the bolt 36 extends along the linear movement direction and further extends through an actuating location where a load (the lifting force) is applied to the actuation device. The actuating location here is the knob 9, or more precisely its central axis, which coincides with the central axis of the bolt 36 in the assembled state. A resulting lifting force applied by an operator to the actuation device is typically applied along the center axis. Accordingly, the lifting force along the center axis of the bolt 36 and components of the resultant magnetic forces acting on the respective magnet assemblies 31*a* and 31*b* at the coupling locations located on the bolts 6*a* and 6*b* act on the exposed actuation device. In addition, in the case of locked compensating elements 7*a* and 7*b*, opposing moments can also occur at the locations of slotted holes 37*b*1 and 37*b*2. Since the coupling locations are arranged symmetrically with respect to the axis of the resulting lifting force (center axis of bolt 36) and thus have a lever arm of equal size with respect to this axis, and in the case of locked compensating elements, the moments are opposite to each other, no resulting moment acts on the actuation device (on the portion moving linearly along the linear movement direction) when the lifting force is applied to it. If no torque acts on the actuation device, the actuation device can be moved particularly easily along the linear movement direction. In particular, no constraining forces are created. This can be achieved, in particular, by arranging the coupling locations symmetrically with respect to an axis passing through an actuating point at which an operator grips the actuation device along the linear movement direction. Particularly in the case of a plurality of magnet packages, the coupling locations for performing the pivot movement can be arranged in such a way that no torque acts on the actuation device. This makes it particularly easy to move the actuation device along the linear movement direction even during the pivoting movement of the magnet packages. In particular, no constraining forces are created. This can be achieved, in particular, by arranging the coupling locations symmetrically with respect to an axis passing through an actuating location at which an operator grips the actuation device along the linear movement direction.

The actuation device has the bolt 36 and the knob 9, both of which extend coaxially along the linear movement direction. Bolt 36 and knob 9 thus represent a linear extension portion whose axis extends along the linear movement direction.

This facilitates alignment along the linear movement direction and thus ease of operation for an operator. In addition, a lifting force can be transmitted along the linear movement direction along the linear extension portion.

Further, the actuation device has the lever plate 37 that shifts forces away from the axis of the linear extension portion (axis of the bolt 36 and the knob 9). Thus, the lever plate is a lever portion configured to displace a force having a component along the linear movement direction from an axis of the linear movement direction passing through an actuation location at which a load is introduced into the actuation device along the linear movement direction, respectively, to at least one coupling location remote from the axis of the linear movement direction.

The lever portion is force-coupled to the linear extension portion via the two lock nut structures 5*a* and 5*b*.

The lever portion may provide the actuating location spaced from the coupling locations at which the actuation device is coupled to the at least one magnetic pack. Thus, an adaptation to spatial boundary conditions in a formwork device can be made. In addition, a lifting force may be introduced centrally into the lifting portion and then shifted outwardly for introduction into the magnet packages to provide the greatest possible lever arm. In the embodiment, a single actuation device 9, 36 and 37 is further coupled to the magnet packages 31*a* and 31*b*.

This simplifies configuration by allowing an operator to transfer the plurality of magnet packages from the lock position to the release position using a single actuation device.

Also, the plurality of magnet packages are formed uniformly.

This allows equal magnetic forces to act between the individual magnet packages and the formwork support. This enables a uniform load to be applied to the actuation device, resulting in particular in the absence of torque for the actuation device.

Also, the magnet packages 31*a* and 31*b* are arranged at circumferential angles of 180° from each other. More precisely, the perpendiculars to the pivot axis 32 of the two magnet packages 31*a*, which run parallel to the formwork support 4, form a straight line. Thus, the magnet packages 31*a* and 31*b* are arranged uniformly in a circumferential direction about a central axis.

This simplifies the configuration and can also provide a uniform load on the actuation device.

The center axis of the pin 36 coincides with the center axis about which the magnet packages 31*a* and 31*b* are evenly spaced. Thus, the central axis around which the magnet packages 31*a* and 31*b* are uniformly arranged coincides with an axis of the linear movement direction passing through an actuating location at which a load is introduced into the actuation device along the linear motion direction.

This also simplifies the configuration. In particular, the lifting force can be introduced centrally and then distributed evenly to the magnet packages around the central axis.

Further, a single support device 32 may be disposed in a center between the plurality of magnet packages. The center axis of the bolt 36 extends through the support device 33 and is also a center axis of the support device 33, Furthermore, the magnet packages 31*a* 31*b* which oppose each other have a common pivot axis.

This keeps the magnet device compact and the working space can be kept small. In particular, the support device 33 can be arranged centrally and a symmetrical introduction of force into the support device 33 can be achieved.

The system has a formwork device 2, which has a formwork portion 21 for shaping concrete parts, and a switchable magnet device 3 according to the preceding embodiments. The switchable magnet device is coupled to the formwork device 2 at least in the interaction position of the of the magnet packages 31*a* and 31*b* in such a way that a pressing force is transmitted to the formwork device with a component in the direction of the formwork support 4.

Thus, above magnet device can fix the formwork device in its position in the interaction position. In particular, access to the actuation device on the formwork device can be provided relatively small compared to the prior art, in which a large recess is provided for the actuation lever.

The formwork device 2, as shown in FIG. 1, has a formwork bearing portion 23. The formwork bearing portion 23 supports the formwork portion 21 and has a cover portion 23*a*, which is located on a side facing away from the formwork support 4 and preferably extends horizontally here. On both sides in the longitudinal direction of the formwork device 2, defined by the longitudinal extent of the formwork portion 21, lateral portions 23*b* extend downwardly from the cover portion 23*a* toward the formwork support. Cover portion 23*a* and the two lateral portions 23*b* form a receiving space inside which the magnet device is received at least in portions. Only the knob 9 protrudes upward from the formwork bearing portion 23.

This allows the magnet device 3 to be protected from the formwork device 2, and the system can be made compact. Since the actuation device can move linearly, only a narrow recess needs to be provided to guide the actuation device out.

The knob 9 is configured to be detachable from the bolt 36 so that the knob 9 can also be removed. The actuation device thus has a detachable portion that can be coupled to actuate the magnet device.

Thus, a recess 23*a*1, through which the actuation device is guided to the outside, can also be closed. As previously mentioned, the formwork device (the formwork bearing portion 23) has the guide bushing 22 that guides the knob 9 along the linear movement direction. Thus, at least one guide device has a portion of the formwork device.

Thus, a portion of the actuation device can be guided by the formwork device, which stands stably on the formwork support Thus, stable guidance can be ensured. The guide bushing is particularly easy to attach to the shaving device, for example by welding.

As mentioned above, the bottom surface 9*b* of the knob 9 rests on one end of a spring 10 which is partially received in the receiving space 9*a*. The spring 10 is configured here as a compression spring. The opposite end of the spring 10 rests on the bottom surface 22*b* of the bushing 22. Thus, the system 1 has at least one elastic element via which the magnet device 3 is coupled to the formwork device 2 at least in the interaction position of the at least one magnet package. More precisely, the spring 10 is arranged between the magnet device 3 and the formwork device 2.

This can ensure that the pressing force is reliably introduced into the formwork device 2. In particular, a double fit can be avoided if the magnet packages rest on the formwork support 4.

It is not shown, but advantageous, if the magnet device comprises at least one release support device configured to support a transfer of the respective magnet package into the release position. Preferably, the release'support device is coupled to the at least one support device and preferably comprises at least one elastic element, more preferably a spring element. The spring 10 just described is also part of a release support device. The elastic spring force supports the lifting of the magnet packages and, if necessary, can hold the magnet packages in the release position.

With reference in particular to FIG. 5, the assembly of the system 1 according to the invention is now explained.

As shown in FIG. 5, a substantially rectangular frame plate 13 is used for assembly. The frame plate has a substantially rectangular recess 13*a* that has larger dimensions than the assembled magnet packages 31*a* and 31*b*. The frame plate 13 can rest on a non-magnetic support, for example a wooden table, the support also having a recess of at least the size of the recess 13*a*. Then, the magnet packages 31*a* and 31*b* preassembled on the support device 33 can be inserted into the recess. The actuation device is also preassembled except for the knob 9.

The guide rods 11*a* and 11*b* are provided on the frame plate 13. The pre-assembled actuation device can then be easily placed on the guide rods 11*a* and 11*b* via the openings 37*c*1 and 37*c*2. Finally, the pre-assembled magnet assemblies 31*a* and 31*b* can be aligned accordingly and coupled to the actuation device via the compensating elements 7*a* and 7*b*.

The frame plate 13 further has an auxiliary mounting opening 13*b* on each of the two transverse sides. The formwork device 2 also has corresponding auxiliary mounting openings at a lower portion 23*c* facing the formwork support 4 and extending parallel to the cover portion 23*a*. It should be noted that the formwork device 2 is rotated for better assembly, as shown in FIG. 5. In particular, the lower portion 23*c* in FIG. 5 is directed upwards. To mount the preassembled magnet device 3, locating pins are fitted into the auxiliary mounting holes of the formwork device. Subsequently, the auxiliary mounting holes 13*b* of the frame plate 13 are aligned and fitted with the locating pins. Then, the frame sheet 13 is attached to the formwork device 2 via through-holes 13*c* at all four corners of the frame plate with corresponding holes in the lower portion 23*c* of the formwork device 2 by means of bolts and nuts, as shown in FIG. 1 Finally, the dowel pins are pulled.

When assembled and aligned on the formwork support 4, the frame plate 13 is located below the lower portion 23*c*.

Thus, for assembly, the frame portion 13 is provided, which has at least one guide device 11*a* or 11*b* and at least one positioning aid 13*b*.

The magnet packages can thereby be aligned according to the guide portion and coupled to the actuation device coupled to the guide device. Subsequently, the entire preassembled magnet device 3 can be aligned relative to the formwork device via the positioning aid. Thus, the magnet device can be set up separately from the formwork device. Assembly is further facilitated if the support device as well as the actuation device and the articulated connection via the bolts 6*a* and 6*b* as well as 8*a* and 8*b* and compensating elements 7*a* and 7*b* are made of non-magnetic materials. For example, these parts can be made of non-magnetic metals or synthetic resins.

Possible modifications to the above embodiment are now described.

While the above embodiment includes two magnet packages, only one or a number greater than two may be provided. In the case of a magnet pack, the actuation device may have a linear extension portion that passes substantially through the load application location of the magnet pack. Thus, the lever portion can be omitted.

In the release position, the magnet packages are pivoted and translationally displaced according to FIG. 4. However, the release position can also be a position in which the at least one magnet package is merely pivoted. Also, the sequence of translation and pivoting is not fixed. In this way, the at least one magnet package can first be swiveled into an intermediate pivot position, from which it is then only lifted translationally into the complete release position. Also, translation and slewing can be performed simultaneously.

Also, the form of the locking mechanism is not limited Thus, for example, the pivoting movement can also be locked by a stop in the support means 33 against which a projection at the lower end of the bolt 36 abuts. Thereby, the relative movement of the relatively movable parts, support device 33 and actuation device (bolt 36 thereof) is immediately blocked.

The number of guide devices is not specified. Preferably, however, a guide device is provided for each coupling point.

The degree of freedom intersecting the linear movement direction is not limited to a rotational degree of freedom At least one translational degree of freedom intersecting the linear movement direction can also be provided with respect to the linearly moving portion (rigid portion consisting of knob 9, bolt 36 and lever plate 37, which form a rigid body in the above embodiment). Thus, instead of the articulated embodiment with the pins 6*a* and 6*b* as well as 8*a* and 8*b*, a sliding block can also be provided, which can move in a sliding manner in the at least one magnet package in a direction intersecting the linear movement direction, preferably perpendicular to the linear movement direction, i.e. parallel to the formwork support in the above embodiment. Preferably, the sliding block is also articulated to allow compensation in orientation. Also, an elastic member, such as an elastomeric portion may be provided between or within the actuation device and magnet assembly.

The actuation device can also be designed integrally. The actuation device may include one or more portions that precede the at least one magnet package in the flow of force when a lifting force is applied thereto.

The shape of the release support means is also not limited. For example, an elastic element such as a compression spring can be provided on the formwork support side, which is arranged between the support device and the formwork support. The spring force can support a movement away from the formwork support. In particular, a translational movement can be supported in the process.

LIST OF REFERENCE SIGNS

1 System
2 Formwork device
3 Magnet device
4 Formwork support
5*a*, 5*b* Lock nut structure
6*a*, 6*b* bolt
7*a*, 7*b* Compensating element
8*a*, 8*b* Bolt
9 Knob
9*a* Knob receiving space
9*b* Knob bottom surface
9*c* Knob outer circumferential surface
10 Spring
11*a*, 11*b* Guiding rod
12*a*, 12*b* lever arm
13 Frame plate
13*a* Recess of the frame plate
13*b* Auxiliary mounting hole
13*c* Through hole of the frame plate
21 Formwork portion
22 bushing
22*a* recess of bushing
22*b* bottom surface of bushing
23 formwork bearing portion
23*a* cover portion
23*a*1 recess of cover portion
23*b* side portion
23*c* bottom portion
31*a*1, 31*b* magnet package
32 pivot axis
33 support means
34 shaft
35 opening of support means
36 bolt
36*a* first threaded portion
36*b* second threaded portion
37 lever plate
37*a* through hole
37*b*1 37*b*2 elongated hole of lever plate
37*c*1, 37*c*2 opening of lever plate

The invention claimed is:

1. A switchable magnet device for fixing a formwork device to a formwork support, the switchable magnet device comprising:

a plurality of magnet packages each of which can be transferred between an interaction position, in which the plurality of magnet packages are in magnetic operative connection to a magnetizable formwork support, and a release position, in which the magnetic operative connection between the magnetizable formwork support and the plurality of magnet packages is reduced;

wherein the plurality of magnet packages are configured to, when moving between the interaction position and the release position, at least in portions, perform a pivot movement about a pivot axis;

at least one actuation device which is coupled to the plurality of magnet packages to move the plurality of magnet packages between the interaction position and the release position and to perform the pivot movement of the plurality of magnet packages;

wherein the at least one actuation device is configured to perform a linear movement along a linear movement direction at least temporarily during the pivot movement of the plurality of magnet packages and perform the linear movement away from the magnetizable formwork support during the pivot movement from the interaction position to the release position;

wherein each of the plurality of magnet packages are configured to simultaneously perform the pivot movement about a respective pivot axis thereof; and a single support device which has the respective pivot axis and on which the plurality of magnet packages is pivotally mounted about the respective pivot axis;

wherein the at least one actuation device is relatively movable with respect to the single support device;

wherein the at least one actuation device can be respectively coupled to the plurality of magnet packages at a load application location that is further away from the respective pivot axis than a force application location of a resulting force that acts on the plurality of magnet packages due to the magnetic operative connection, respectively, for performing the pivot movement; and wherein the single support device is arranged in a center between the plurality of magnet packages.

2. The switchable magnet device according to claim 1, wherein the linear movement direction is a direction substantially perpendicular to the formwork support.

3. The switchable magnet device according to claim 1, wherein the at least one actuation device is respectively coupled to the plurality of magnet packages in such a way that the plurality of magnet packages have at least one degree-of-freedom intersecting the linear movement direction, respectively, with respect to a portion linearly moveable along the linear movement direction of the at least one actuation device.

4. The switchable magnet device according to claim 1, further including at least one guide device configured to guide the at least one actuation device along the linear movement direction.

5. The switchable magnet device according to claim 1, wherein the plurality of magnet packages are configured to perform a translational movement during or after the pivot movement about the respective pivot axis.

6. The switchable magnet device according to claim 1, further including a locking mechanism configured to lock pivotal movement of the plurality of magnet packages.

7. The switchable magnet device according to claim 1, wherein the at least one actuation device comprises coupling locations with the plurality of magnet packages arranged such that no torque acts on the at least one actuation device for performing the pivot movement of the plurality of magnet packages.

8. The switchable magnet device according to claim 1, further including at least one release support device configured to support moving a respective one of the plurality of magnet packages to the release position.

9. The switchable magnet device according to claim 1, wherein in the release position, the magnetic operative connection between the magnetizable formwork support and the plurality of magnet packages is cancelled.

10. A system, comprising:

a formwork device comprising a formwork portion for shaping concrete parts; and the switchable magnet device according to claim 1, wherein the switchable magnet device is coupled to the formwork device at least in the interaction position of the plurality of magnet packages such that a pressing force is transmitted to the formwork device with a component in a direction of the formwork support.

* * * * *